United States Patent
Block et al.

(10) Patent No.: US 12,509,213 B2
(45) Date of Patent: Dec. 30, 2025

(54) AUXILIARY FLAP ASSEMBLY

(71) Applicant: The Boeing Company, Arlington, VA (US)

(72) Inventors: Samuel L. Block, Bothell, WA (US); Kevin Tsai, Redmond, WA (US)

(73) Assignee: The Boeing Company, Arlington, VA (US)

( * ) Notice: Subject to any disclaimer, the term of this patent is extended or adjusted under 35 U.S.C. 154(b) by 2 days.

(21) Appl. No.: 18/319,305

(22) Filed: May 17, 2023

(65) Prior Publication Data

US 2024/0383599 A1    Nov. 21, 2024

(51) Int. Cl.
*B64C 9/02*     (2006.01)
*B64C 9/08*     (2006.01)
*B64C 9/16*     (2006.01)

(52) U.S. Cl.
CPC ............. *B64C 9/02* (2013.01); *B64C 9/08* (2013.01); *B64C 9/16* (2013.01)

(58) Field of Classification Search
CPC ............. B64C 9/02; B64C 9/08; B64C 9/16
See application file for complete search history.

(56) References Cited

U.S. PATENT DOCUMENTS

| | | | | |
|---|---|---|---|---|
| 8,490,927 B2* | 7/2013 | Parker | ........................ | B64C 9/16 244/215 |
| 9,227,722 B2* | 1/2016 | Soenarjo | ................... | B64C 9/02 |
| 10,053,237 B2* | 8/2018 | Huang | ....................... | B64C 9/16 |
| 10,737,763 B2* | 8/2020 | Schlipf | ....................... | B64C 9/02 |
| 10,889,365 B2* | 1/2021 | Bowers | ....................... | B64C 9/02 |
| 11,186,356 B2* | 11/2021 | Schlipf | ....................... | B64C 9/22 |
| 11,286,033 B2* | 3/2022 | Lorenz | ....................... | B64C 9/02 |
| 2024/0286731 A1* | 8/2024 | Schlipf | ....................... | B64C 9/16 |

OTHER PUBLICATIONS

U.S. Appl. No. 17/656,376, filed Mar. 24, 2022.
File: Flaps Mechanism B787 A320.png, accessed from https://commons.wikimedia.org/wiki/File:Flaps_Mechanism_B787_A320.png on May 15, 2023.
Rudolph, P., High-Lift Systems on Commercial Subsonic Airliners, Sep. 1996, p. 1-166, NASA Contractor Report 4746, National Aeronautics and Space Administration.

* cited by examiner

*Primary Examiner* — Richard Green
(74) *Attorney, Agent, or Firm* — Kunzler Bean & Adamson (57) ABSTRACT

An auxiliary flap assembly includes a base fixable to an aircraft wing, a track, a first pair of rollers, and a second pair of rollers. The base includes a first plate and a second plate. The track is coupled to the base and includes a first half defining a non-linear first roller path and a second half defining a non-linear second roller path in a back-to-back configuration. Both halves extend between a free end portion and a fixed end portion of the track. At least a portion of the first and second roller paths is interposed between the first plate and the second plate of the base. The fixed end portion is attachable to the flap. The track is movable along the first and the second pairs of rollers to move the flap between, and inclusive of, a stowed position and a deployed position.

20 Claims, 8 Drawing Sheets

AUXILIARY FLAP ASSEMBLY

FIELD

This disclosure relates generally to operation systems for securing and stabilizing aircraft wing flaps, and more particularly to auxiliary flap assemblies that are failsafe and jam-tolerant.

BACKGROUND

A flap is a high lift device typically consisting of a hinged panel or panels mounted on an aircraft wing, such as the trailing edge of the wing. The flap's setting (e.g., the position and orientation of the flap relative to the wing) can be adjusted to increase the camber and, in some applications, the chord and surface area of the wing. The wing's camber can indicate the convexity of the upper part of the wing and the concavity of the lower part of the wing. Extending flaps during flight can increase lift and drag while also reducing stall speed, which can improve the aircraft's performance during takeoffs and landings. During a landing, the extended flaps enable the aircraft to travel at lower landing speeds that can reduce the length of the landing strip required. Extended flaps can also increase drag, which enables the aircraft to steepen its descent angle without increasing overall airspeed.

The configurations of the flaps can vary across different types of aircraft. For instance, large jetliners are often designed with flaps that have multiple portions (e.g., three-part flaps) while smaller aircrafts have appropriately sized flaps that attach to the wings via hinges. To adjust the settings of the flaps, flap operation systems are built into the wings, which can include actuators to extend or retract the flaps to effectively change the profiles and surface areas of wings. In addition to the actuators, flap operation systems can also incorporate auxiliary support structures can help stabilize and align the flaps during different settings.

SUMMARY

The subject matter of the present application has been developed in response to the present state of the art, and in particular, in response to the shortcomings of current auxiliary flap assemblies that are not failsafe and tend to jam. Known auxiliary flap assemblies are susceptible to debris accumulating between rollers and the flap assembly track, which can cause the rollers to jam and/or break. These events tend to introduce abnormally high bending loads into the flap and/or wing of the aircraft, which can affect performance of the aircraft. These shortcomings have not yet been fully solved by currently available techniques.

Accordingly, the subject matter of the present application has been developed to provide a failsafe, jam-resistant auxiliary flap assembly to overcome at least some of the above-discussed shortcomings of prior art techniques. The following is a non-exhaustive list of examples, which may or may not be claimed, of the subject matter, disclosed herein.

According to one aspect of the disclosure, an auxiliary flap assembly is provided for an aircraft wing having a flap. In some embodiments, the auxiliary flap assembly includes a base fixable to the aircraft wing, where the base includes a first plate and a second plate. In some embodiments, a track is coupled to the base and includes a first half and a second half coupled together in a back-to-back configuration.

In some embodiments, the first half of the track defines a first roller path and the second half of the track defines a second roller path. Each one of the first roller path and the second roller path extends between a free end portion of the track and a fixed end portion of the track. In some embodiments, the first roller path and the second roller path are non-linear, and at least a portion of the first and the second roller paths is interposed between the first plate and the second plate. In some embodiments, the fixed end portion is attachable to the flap.

In some embodiments, the auxiliary flap assembly further includes a first pair of rollers and a second pair of rollers. In some embodiments, the first pair of rollers has a spaced-apart configuration, and each one of the first pair of rollers is disposed within the first roller path and is fixed to the first plate. In some embodiments, the second pair of rollers also has a spaced-apart configuration and each roller of the second pair of rollers is disposed within the second roller path and is fixed to the second plate. In some embodiments, the track is movable along the first pair of rollers and the second pair of rollers to move the flap between, and inclusive of, a stowed position and a deployed position.

In some embodiments, the fixed end portion of the track includes a spherical bearing configured to attach to the flap. In some embodiments, a pin extends through the spherical bearing. In some embodiments, the pin includes a pin-in-pin configuration. In some embodiments, the first roller path and the second roller path form an S-shape.

In some embodiments, the first half of the track and the second half of the track include a C-shaped channel. The C-shaped channel of the first half defines the first roller path and the C-shaped channel of the second half defines the second roller path. The first pair of rollers is contained within and rolls along the C-shaped channel of the first half, and the second pair of rollers is contained within and rolls along the C-channel of the second half.

In some embodiments, each of the first pair of rollers is coaxial with each of the second pair of rollers. In some embodiments, one of the first pair of rollers is offset from the other of the first pair of rollers and one of the second pair of rollers is offset from the other of the second pair of rollers. In some embodiments, the first pair of rollers is fixed to the first plate and the second pair of rollers is fixed to the second plate.

In some embodiments, the flap includes a load, and the first and the second pair of rollers are configured to distribute the load relative to the auxiliary flap assembly. In some embodiments, each one of the first and the second pair of rollers includes a breakable pin configured to break in response to jamming and/or breaking of the corresponding roller. In some embodiments, each one of the first and the second pair of rollers is configured to tolerate an entirety of the load if/when a roller jams or breaks.

According to a second aspect of the disclosure, an aircraft includes an aircraft wing and a flap coupled to the aircraft wing that extends in a spanwise direction from an inboard end to an outboard end. An auxiliary flap assembly is coupled to the flap and to the aircraft wing.

In some embodiments, the auxiliary flap assembly includes a base coupled to the aircraft wing that includes a first plate and a second plate. The auxiliary flap assembly further includes a track coupled to the base. The track includes a first half and a second half coupled together in a back-to-back configuration. In some embodiments, the first half defines a first roller path and the second half defines a second roller path. Each one of the first roller path and the second roller path extends between a free end portion of the track and a fixed end portion of the track. In some embodiments, the first roller path and the second roller path are non-linear and at least a portion of each one of the first and the second roller paths is interposed between the first plate and the second plate. In some embodiments, the fixed end portion is attached to the flap.

In some embodiments, the auxiliary flap assembly includes a first pair of rollers and a second pair of rollers. The first pair of rollers has a spaced-apart configuration where each of the first pair of rollers is disposed within the first roller path and fixed to the first plate. The second pair of rollers also has a spaced-apart configuration where each of the second pair of rollers is disposed within the second roller path and is fixed to the second plate. The track is movable along the first pair of rollers and the second pair of rollers to move the flap between, and inclusive of, a stowed position and a deployed position relative to the aircraft wing.

In some embodiments, the auxiliary flap assembly is coupled to the inboard end or the outboard end of the flap. In some embodiments, the aircraft wing is fairingless at a position of the auxiliary flap assembly. In some embodiments, the aircraft further includes a main flap assembly coupled to the aircraft wing and to the flap, a main fairing coupled to the aircraft wing at a position of the main flap assembly, and an auxiliary fairing coupled to the aircraft wing at the auxiliary flap assembly. In some embodiments, the auxiliary fairing includes a depth that is less than two-thirds of a depth of the main fairing. In some embodiments, the auxiliary fairing includes a depth that is less than one-half of a depth of the main fairing.

According to a third aspect of the disclosure, a method includes moving a track along a non-linear path relative to a base so that a flap coupled to an end of the track also moves along the non-linear path. The flap moves between, and inclusive of, a stowed position and a deployed position relative to an aircraft wing. While moving the track, a set of rollers rolls within and along a pair of C-shaped channels. In some embodiments, moving the track includes moving the track along an S-shaped curve so that the flap follows a drop-down path relative to the aircraft wing.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

As discussed above, known auxiliary flap assemblies are susceptible to debris accumulating between rollers and the flap assembly track, which can cause the rollers to jam and/or break. Various embodiments of the invention disclosed herein address these and other issues.

Figure 1:
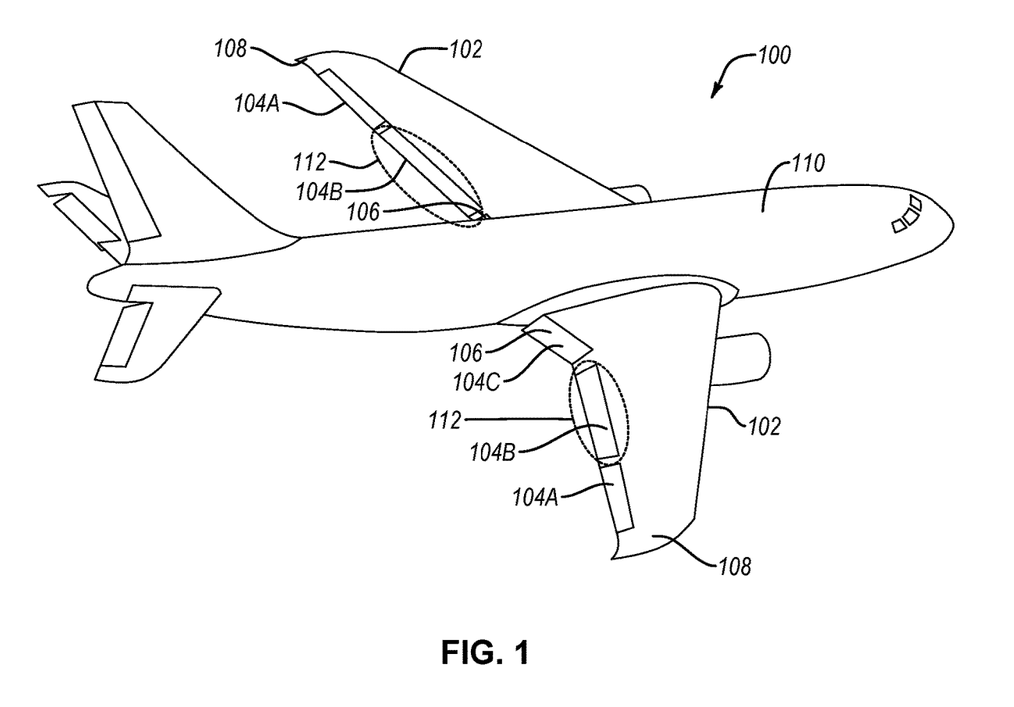
FIG. 1 is a perspective view of a fixed-wing aircraft with mechanical flap systems, according to one or more examples of the present disclosure.

Referring now to the Figures, FIG. 1 illustrates an aircraft 100 configured with flap operation systems that enable flap deflection during operation. In the example embodiment, the aircraft 100 includes two aircraft wings 102 extending outwardly from a body 110 of the aircraft 100, and each extending from an inboard end 106 of the aircraft wing 102 to an outboard end 108 of the aircraft wing 102. As shown, each aircraft wing 102 may include multiple flaps, such as those labeled as flap 104A, flap 104B, and flap 104C. In order to enable computing devices on the aircraft 100 to adjust the flaps 104A-C during operations, each one of the flaps 104A-C may be connected to a flap operation system 112 that is built into the aircraft wings 102 and can be used to reposition the flaps 104A-C relative to the aircraft wing 102. The flap operation system 112 may include operational components such as mechanical, hydraulic, electric, pneumatic, and/or other suitable operational components. For illustration purposes, the flap operation system 112 is outlined in FIG. 1. Flaps 104A, 104C may also have flap operation systems (not outlined), which may operate collectively with the flap operation system 112 and/or independently during aircraft operations.

The aircraft 100 represents a fixed-wing example of an aircraft that may use flaps 104A-C during operations, which can increase performance during takeoff and landing. When the flaps 104A-C are positioned in a down orientation, the camber of the aircraft 100 enables the aircraft wings 102 to produce more lift. Depending on the aircraft 100, the flap 104B may extend to various degrees. For instance, the aircraft 100 may extend the flap 104B approximately 30 degrees during takeoff and 40 degrees during landing. After liftoff, the aircraft 100 may retract the flaps 104A-C to avoid drag. As such, deploying the flaps 104A-C can increase lift, which allows the aircraft 100 to climb during takeoff at slow speeds and also safely descend during landing also at slow speeds.

Figure 4:
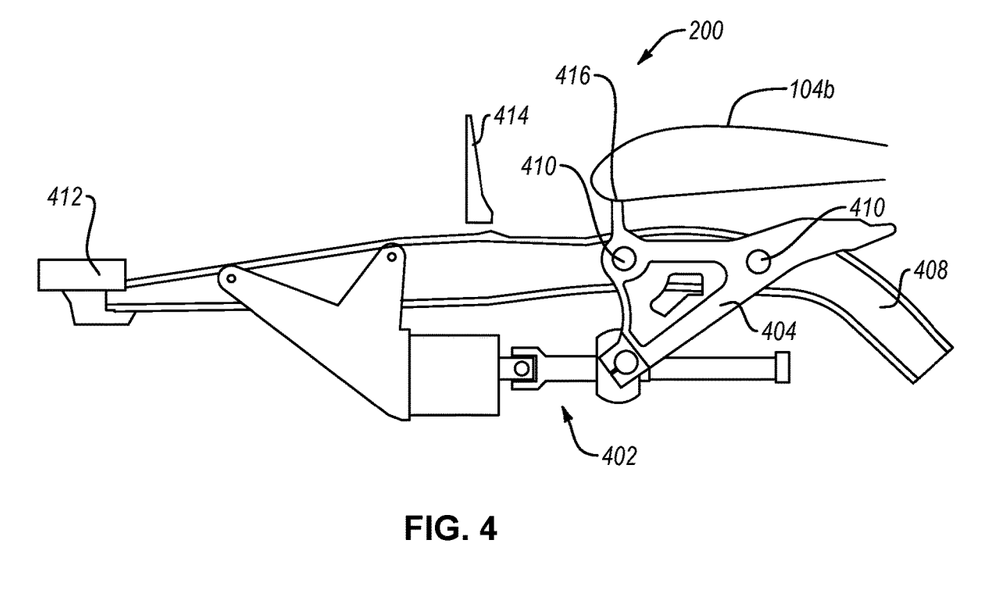
FIG. 4 is a perspective view of an example of a main flap support assembly, according to one or more examples of the present disclosure.

To adjust the settings of the flaps 104A-C, aircraft computing devices may transmit signals to one or more actuators positioned within the aircraft wings 102. For instance, as discussed in more detail below, the flap operation system 112 can include one or multiple flap actuators that generate force to adjust the setting of the flaps 104A-C. Referring now to FIG. 4A, as an example embodiment, the flap operation system 112 incorporates one or more main flap support structures 200 which can use an actuator 402 to extend or retract a corresponding one of the flaps 104A-C. In some embodiments, the actuator 402 includes, for example, a ball screw actuator, a geared rotary actuator, a linear hydraulic actuator, or any other suitable actuator to extend or retract a corresponding one of the flaps 104A-C.

Figure 2:
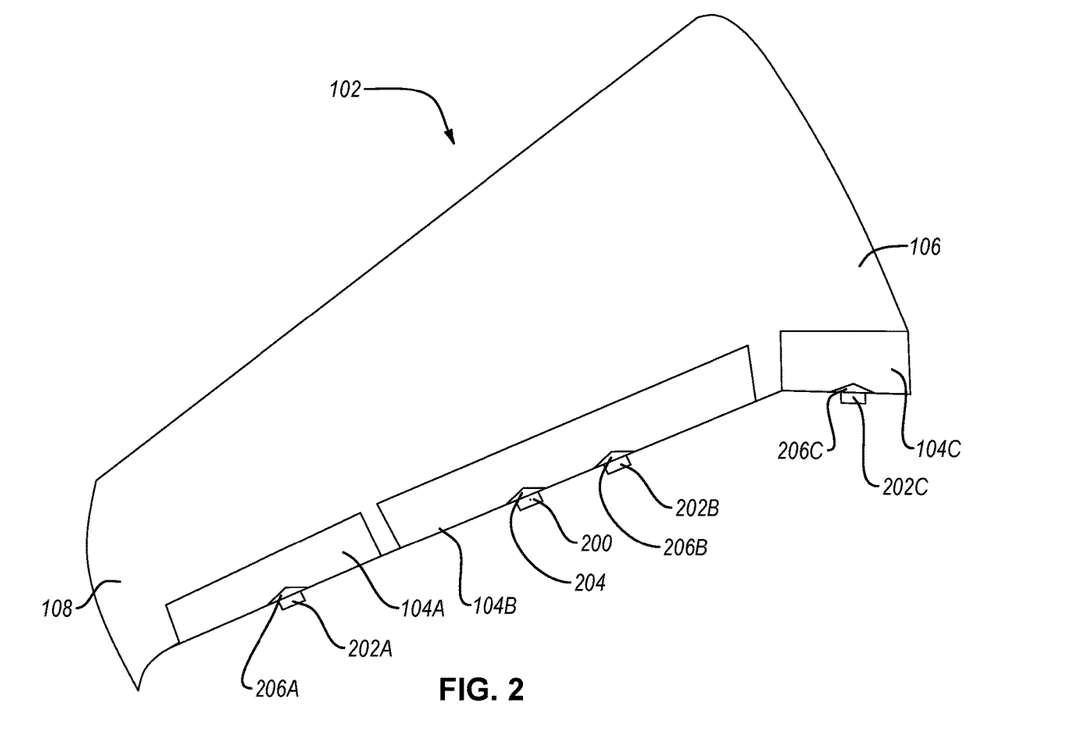
FIG. 2 is a top view of an aircraft wing with multiple flaps and flap support assemblies, according to one or more examples of the present disclosure.

In some embodiments, as shown in FIG. 2, one or more main flap support structures 200 and one or more auxiliary flap assemblies 202A-C are secured to the aircraft wing 102 at fixed positions. The main flap support structures 200 can be used to extend or retract the flaps 104A-C, which adjusts the profile and surface area of the aircraft wing 102 to enable efficient flight at low airspeeds. In some embodiments, each one of the main flap support structures 200 includes a lead screw actuator mechanism driven by an electric or hydraulic motor. The actuator of each one of the main flap support structures 200 can be activated to extend or retract a corresponding one of the flaps 104A-C based on signals received from an aircraft computing system.

In some embodiments, the main flap support structure 200 represents a flap operation system 112 that implemented on the aircraft 100 to adjust the setting of a flap 104A-C. In some embodiments, the aircraft 100 incorporates multiple main flap support structures 200 into flap operation systems 112 on the aircraft wings 102, including the flap operation systems 112 that enable deflection of the flaps 104A-C. In these and other embodiments, a fairing (not shown) is coupled to and/or integrated with the aircraft wing 102 at each of the main flap support structures 200 to increase streamlining and reduce drag.

In some embodiments, the aircraft 100 incorporates one or more auxiliary flap assemblies (e.g., auxiliary flap assemblies 202A, 202B) to assist the main flap support structures 200 (e.g., main flap support structures 200A, 200B in FIG. 3) in stabilizing and aligning the flaps during various settings. The auxiliary flap assemblies 202A, 202B lack an actuator and thus provide passive support that depends on actuation by the main flap support structure 200 or other support systems to drive or adjust the position of the corresponding flap (e.g., flap 104B). The auxiliary flap assemblies 202A, 202B and the main flap support structure 200 may be kinematically compatible to drive the motion of the flaps 104A-C in a desired direction. For example, in some embodiments, the disclosed auxiliary flap assemblies 202A, 202B are configured to support non-planar, helical flap 104A-C motion in a downward direction.

Figure 3:
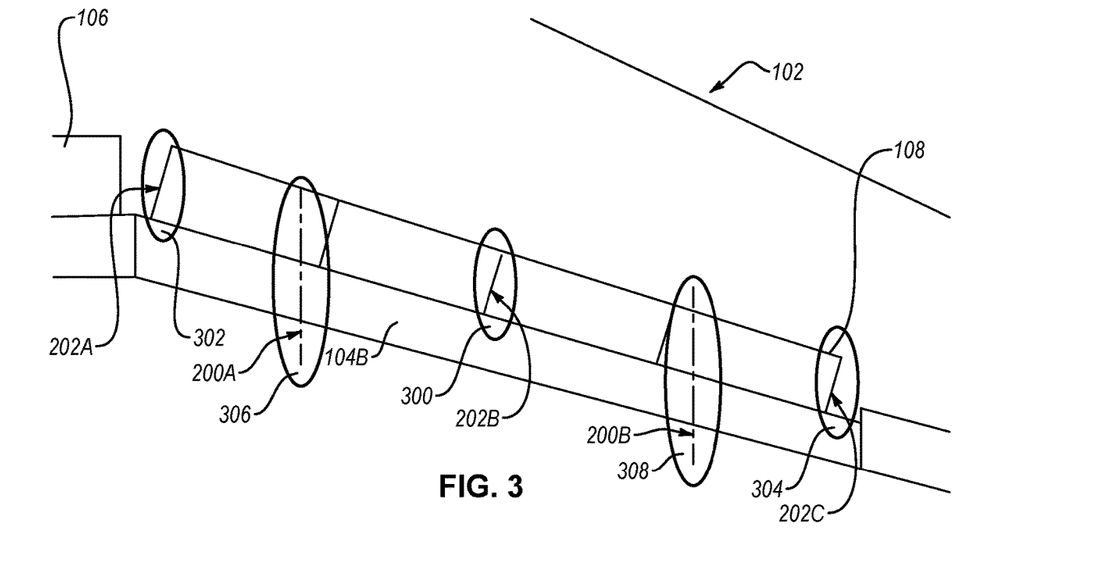
FIG. 3 is a schematic diagram of one example of positioning of flap support assemblies relative to a flap in accordance with certain embodiments of the present disclosure.

Referring now to FIG. 3, some embodiments include more than one main flap support structure 200 and more than one auxiliary flap assembly 202 at spaced-apart locations along the flap 104A-C and/or aircraft wing 102. As discussed above, the actuator 402 of the main flap support structure 200 (or similar device) may supply the force to adjust the setting of an attached flap 104A-C while the auxiliary flap assemblies 202A-C may provide additional flap 104A-C support and stabilization.

For example, in one embodiment, a first main flap support structure 200 is fixed to the aircraft wing 102 at a first mid-span location 306 and a second main flap support structure 200 is fixed at a second mid-span location 308. In some embodiments, auxiliary flap assemblies 202 are interspersed between the main flap support structures 200 to provide additional support and stability. In other embodiments, one or more auxiliary flap assemblies 202 are fixed at an inboard end position 302, an outboard end position 304, and/or at one or more mid-span positions 300 along the aircraft wing 102, regardless of the location, position, or orientation of the main flap support structure 200.

In one embodiment, as shown, an auxiliary flap assembly 202A-C is fixed at an inboard end position 302, an outboard end position 304, and a mid-span position 300 of a single flap 104B. In other embodiments, auxiliary flap assemblies 202A-C are distributed along the aircraft wing 102 such that more or less than one auxiliary flap assembly 202A-C corresponds to a specific flap 104A-C. Of course, main flap support structures 200 and auxiliary flap assemblies 202 may be located, arranged, and/or oriented in any suitable position with respect to each other, a flap 104A-C, and an aircraft wing 102.

Referring now to FIG. 4, the main flap support structure 200 shown is configured with an actuator 402 that can move a flap carriage 404 along a track 408. In practice, the main flap support structure 200 may be secured at a fixed position to the aircraft wing 102 via one or more coupling components 412, 414, while the flap carriage 404 may be coupled to a flap (e.g., the flap 104B) at coupling points 416. With this arrangement, the actuator 402 may adjust the setting of the flap relative to the aircraft wing 102 by changing the position of the flap carriage 404 on the track 408 via the trapped rollers 410 retaining the flap carriage 404 on the track 408. For instance, the actuator 402 can be used to extend or retract the flap 104B, which adjusts the profile and surface area of the aircraft wing 102 to enable efficient flight at low airspeeds. In some embodiments, the actuator 402 is a lead screw type of mechanism driven by an electric or hydraulic motor that can be activated to extend or retract the flap based on signals received from an aircraft computing system.

Referring again to FIG. 3, some embodiments of the auxiliary flap assemblies 202A-C disclosed herein are designed with mechanical features that reduce their manufacturing complexity, as well as their size and profile. As a result, in some embodiments, the aircraft wing 102 may be fairingless at positions of the auxiliary flap assemblies 202A-C. In other embodiments, the auxiliary flap assemblies 202A-C may require a fairing 206A-C having a substantially reduced size and/or profile relative to a fairing 204 corresponding to a main flap support structure 200. This feature may enable the auxiliary flap assemblies 202A-C to be attached to the aircraft wing 102 at any of a mid-span position 300, an inboard end position 302, and/or an outboard end position 304 along the aircraft wing 102 without adding additional weight and/or drag.

Figure 5:
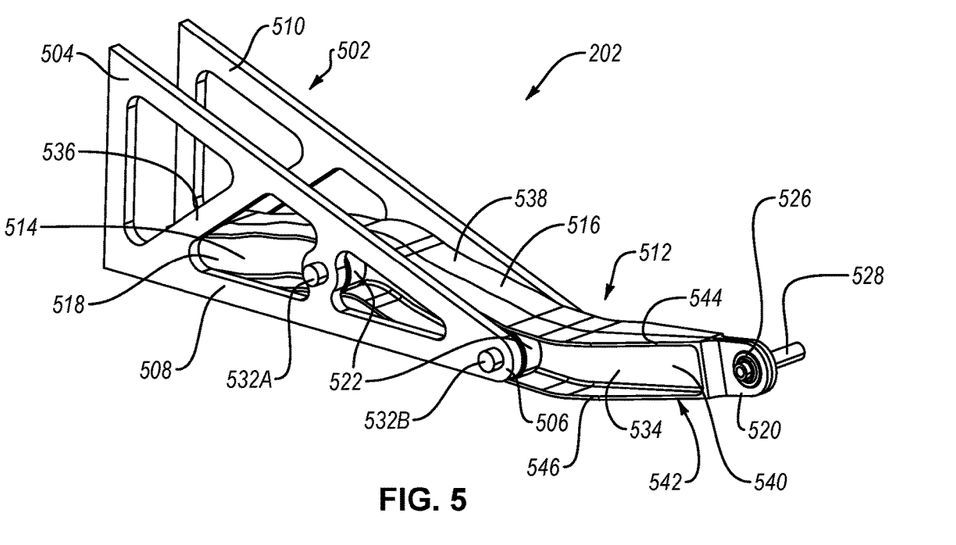
FIG. 5 is a perspective view of an auxiliary flap assembly in a stowed position, according to one or more examples of the present disclosure.
Figure 6:
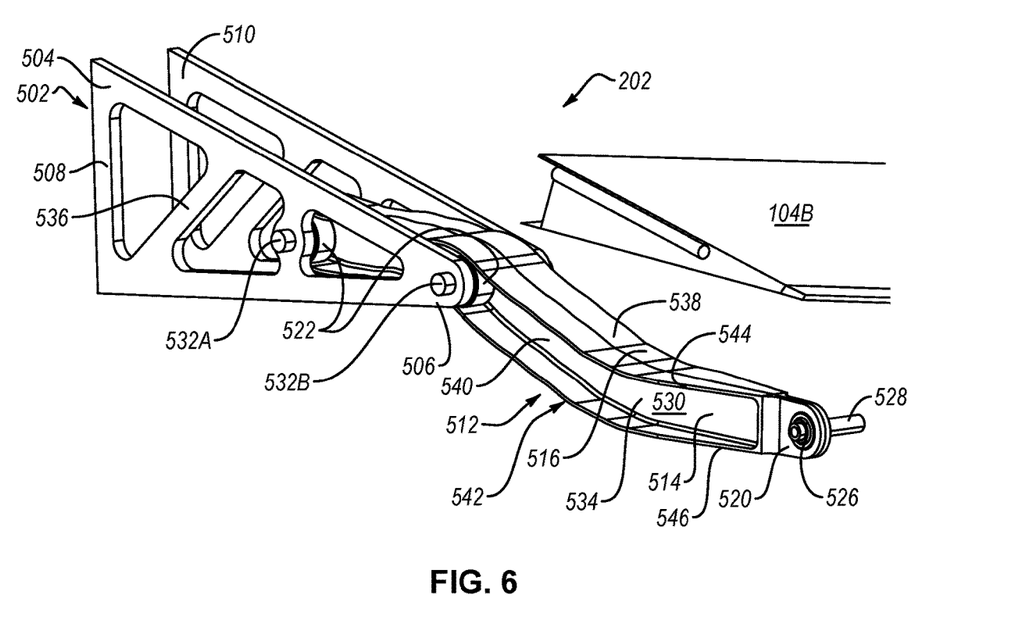
FIG. 6 is a perspective view of the auxiliary flap assembly of FIG. 5 in a deployed position, according to one or more examples of the present disclosure.
Figure 7:
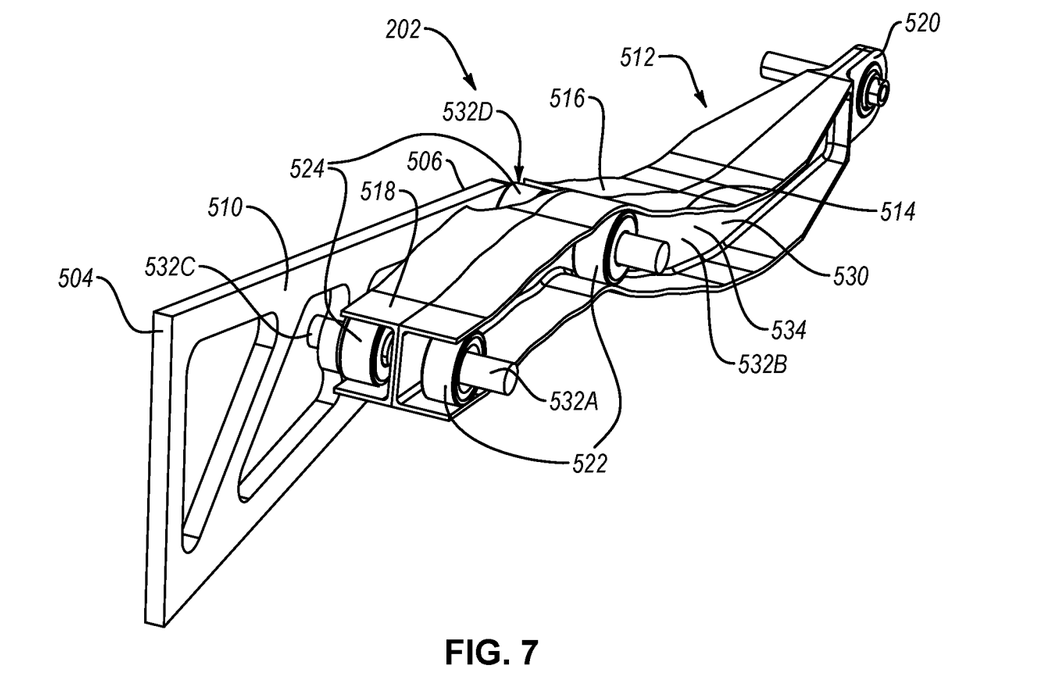
FIG. 7 is an end cutaway view of the auxiliary flap assembly of FIG. 5, according to one or more examples of the present disclosure.

Referring now to FIGS. 5-7, in some embodiments, an auxiliary flap assembly 202 includes a base 502 and a track 512. The base 502 is fixable to an aircraft wing 102 so that the base 502 does not move relative to the aircraft wing 102. In some embodiments, the base 502 is coupled to the track 512 such that the track 512 is movable with respect to the base 502, and thus the aircraft wing 102. In some embodiments, the track 512 may be non-linear (i.e., define a non-linear path) and may extend lengthwise from a fixed end portion 520 of the track 512, which is coupled to a flap (e.g., the flap 104B) to a free end portion 518 of the track 512. In some embodiments, the track 512 is movable with respect to the base 502 between a stowed position, as depicted in FIG. 5, and a deployed position, as shown in FIG. 6.

In some embodiments, the base 502, the track 512, and other various components of the auxiliary flap assembly 202 are made of one or more metals, such as steel, aluminum, iron, and/or any other suitable metal or metal alloy. The various dimensions of the base 502, the track 512, and other components of the auxiliary flap assembly 202 can vary based on the type of aircraft that incorporates the auxiliary flap assembly 202.

Similar to the main flap support structure 200 shown in FIG. 4, the auxiliary flap assembly 202 may be used to provide support and alignment to a flap (e.g., the flap 104B) at different settings during aircraft operations. Unlike the main flap support structure 200, however, the auxiliary flap assembly 202 lacks an actuator and therefore provides passive support to a flap as the flap is actuated or driven by other support systems (e.g., the actuator 402 of the main flap support structure 200) to adjust the position of the flap. In some embodiments, as shown in FIG. 3 for example, the flap operation system 112 includes two main flap support structures 200A, 200B positioned at a location 306 near the inboard end 106 and at a location 308 near the outboard end 108 of the flap 104B, as well as multiple auxiliary flap assemblies 202A-C, where one of the auxiliary flap assemblies 202 is positioned at a mid-span position 300 in the middle of the flap 104B. In other embodiments, as shown in FIG. 2, the flap operation system 112 includes one main flap support structure 200 in the middle of the flap 104B and three auxiliary flap assemblies 202A, 202B, 202C where one auxiliary flap assembly 202B is located at a mid-span position, one auxiliary flap assembly 202C is located near the inboard end 106 of the flap and another auxiliary flap assembly 202A is located near the outboard end 108 of the flap.

As shown in FIG. 5, in some embodiments, the base 502 includes a first plate 508 spaced apart from a second plate 510. The first plate 508 and the second plate 510 can be parallel to each other. In some embodiments, the first plate 508 and the second plate 510 are fixed to the aircraft wing 102 via one or more types of fasteners, such as bolts and screws, adhesives, welding, and/or a combination thereof. The first plate 508 and the second plate 510 can be substantially identical to one another in size and/or shape. In certain embodiments, for example, each one of the first plate 508 and the second plate 510 is an angle bracket having one or more reinforcement ribs 536. In some embodiments, each one of the first plate 508 and the second plate 510 converges (e.g., has a height that decreases) in a direction from a proximal end 504 of the plates to a distal end 506 of the plates.

In some embodiments, the track 512 is coupled to the base 502 such that at least a portion of the track 512 is interposed between the first plate 508 and the second plate 510. A distance between the first plate 508 and the second plate 510 can be greater than a maximum width of the track 512 (e.g., a maximum width of a top surface 538 and a bottom surface 542 of the track 512) such that the top surface 538 and the bottom surface 542 are interposed between the first plate 508 and the second plate 510 without interference. In some embodiments, a length of the track 512 extends in a direction parallel to the first plate 508 and the second plate 510.

The track 512 includes opposing C-shaped channels 530. The C-shaped channels 530 are defined between a central web 540 of the track 512 and corresponding sides of a top flange 544 of the track 512 and a bottom flange 546 of the track 512. The top flange 544 defines a top surface 538 of the track 512 and the bottom flange 546 defines a bottom surface 542 of the track 512.

In some embodiments, the track 512 includes a first half 514 and a second half 516 coupled together in a back-to-back configuration. When coupled together in this manner, the C-shaped channels 530 of the first half 514 and the second half 516 face outwardly away from each other. Additionally, corresponding sides of the first half 514 and the second half 516 are positioned adjacent to each other such that the sides collectively define the central web 540 of the track 512, and the first half 514 and the second half 516 collectively form the top flange 544 and the bottom flange 546 of the track 512.

In some embodiments, the first half 514 and the second half 516 may be individually separately manufactured before being joined together. In these and other embodiments, the first half 514 and the second half 516 may be mechanically coupled together, via any suitable mechanism or technique, such as fasteners, adhesives, welds, etc., to collectively form the track 512. In other embodiments, the first half 514 and the second half 516 may be joined (e.g., metallurgically bonded) together during manufacture of the first half 514 and the second half 516.

In some embodiments, each one of the first half 514 and the second half 516 is non-linear and includes undulations and/or inflections along its length. In these and other embodiments, the first half 514 and the second half 516 may be substantially identical such that the undulations and/or inflections of the first half 514 match the undulations and/or inflections of the second half 516.

The C-shaped channel 530 of the first half 514 of the track 512 defines a first roller path 534 and the C-shaped channel 530 of the second half 516 of the track 512 defines a second roller path (see, e.g., FIG. 7). The first roller path 534 and the second roller path, which mirrors the first roller path 534, extend from the free end portion 518 of the track 512 to the fixed end portion 520 of the track 512. In some embodiments, the first roller path 534 and the second roller path (e.g., the C-shaped channels 530) are sized and shaped to sufficiently retain at least one roller within the first roller path 534 and the second roller path, while enabling the at least one roller to roll along the C-shaped channels 530.

Referring now to FIG. 7, in some embodiments, the auxiliary flap assembly 202 includes a first pair of rollers 522 and a second pair of rollers 524. The first pair of rollers 522 is attached to the first plate 508 so that each roller of the first pair of rollers 522 is rotatable relative to the first plate 508. The first pair of rollers 522 are spaced apart from each other along a length of the track 512 and are disposed within the first roller path 534. Similarly, the second pair of rollers 524 is attached to the second plate 510 so that each roller of the second pair of rollers 522 is rotatable relative to the second plate 510. The second pair of rollers 524 are spaced apart from each other along a length of the track 512 and are disposed within the second roller path. Additionally, the first pair of rollers 522 and the second pair of rollers 524 are interposed between the first plate 508 and the second plate 510. The first pair of rollers 522 are rollable along the first roller path 534 and the second pair of rollers 524 are rollable along the second roller path to move the track 512 relative to the first plate 508 and the second plate 510 (and thus the aircraft wing 102) and to move the flap (e.g., the flap 104B) between, and inclusive of, the stowed position of FIG. 5 and the deployed position of FIG. 6.

In some embodiments, each one of the first pair of rollers 522 is rotatably attached to the first plate 508 via a corresponding one of breakable pins 532A, 532B, which extend perpendicularly relative to the length of the track 512. In certain embodiments, one of the first pair of rollers 522 is disposed at an intermediate location between the proximal end 504 of the first plate 508 and the distal end 506 of the first plate 508, and the other of the first pair of rollers 522 is disposed at the distal end 506 of the first plate 508. Each of the first pair of rollers 522 is configured to rotate about its corresponding one of the breakable pins 532A, 532B while aligned with a corresponding one of the C-shaped channels 530 of the track 512. Similarly, in some embodiments, each one of the second pair of rollers 524 is rotatably attached to the second plate 510 via a corresponding one of the breakable pins 532C, 532D, which extend perpendicularly relative to the length of the track 512. In certain embodiments, one of the second pair of rollers 524 is disposed at an intermediate location between the proximal end 504 of the second plate 510 and the distal end 506 of the second plate 510, and the other of the second pair of rollers 524 is disposed at the distal end 506 of the second plate 510. Each one of the second pair of rollers 524 is configured to rotate about its corresponding one of the breakable pins 532C, 532D while aligned with a corresponding one of the C-shaped channels 530 of the track 512. In this manner, one of each of the first and the second pairs of rollers 522, 524 is axially aligned with another of the first and second pairs of rollers 522, 524.

In some embodiments, the first pair of rollers 522 may engage the C-shaped channel 530 of the first half 514 of the track 512 and the second pair of rollers 524 may engage the C-shaped channel 530 of the second half 516 of the track 512. In this manner, the pairs of rollers 522, 524 may be positioned opposite and aligned with each other to synchronously rotate and move the track 512 between the stowed position and the deployed position. In addition, the corresponding pairs of rollers 522, 524 may provide support to the track 512, as well as increase tolerance of potential jams during movement of the track 512 along the rollers 522, 524.

Figure 8:
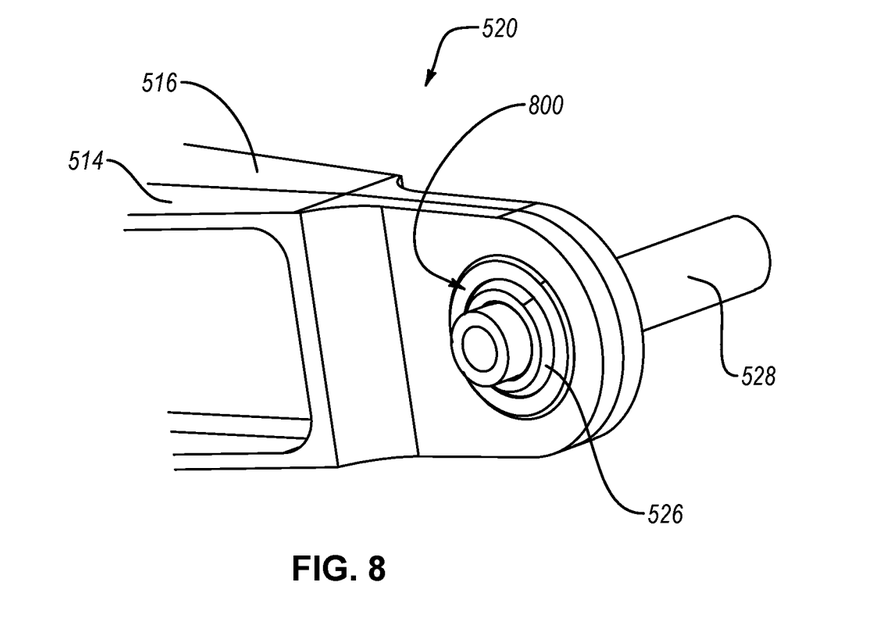
FIG. 8 is an enlarged perspective view of a fixed end of a track in accordance with some embodiments of the present disclosure.

Referring now to FIG. 8, in some embodiments, the fixed end portion 520 of the track 512 includes a spherical bearing 526 positioned within an aperture 800 formed in the first half 514 and the second half 516 of the track 512. In some embodiments, the flap (e.g., flap 104B) is secured to the fixed end portion 520 by a pin 528 passing through the first half 514, the second half 516, and the spherical bearing 526. In some embodiments, the pin 528 has a pin-in-pin configuration to provide redundancy and failsafety, in the event one of an inner pin or an outer pin of the pin 528 unexpectedly fails, for example.

The spherical bearing 526 may enable the flap, which can be any one of the flaps 104A-C, to move relative to the fixed end portion 520 of the track 512. For example, in some embodiments, the spherical bearing 526 may enable the flap to rotate and/or pivot relative to the fixed end portion 520 of the track 512. In some embodiments, the flap includes a flap bracket (not shown), which is fixed to the flap (such as via fasteners) and retains the spherical bearing 526 in place relative to the flap. The spherical bearing 526 may enable the flap to pivot or rotate into any one or more of an infinite number of orientations relative to the fixed end portion 520 of the track 512. In this manner, the spherical bearing 320 may facilitate self-alignment of the flap relative to the fixed end portion 520, while also resisting shock loads. In certain embodiments, the spherical bearing 526 is a spherical roller bearing, a spherical plain bearing, a rod end, a spherical ball bearing, or any other suitable spherical bearing known to those in the art.

Referring now to FIGS. 9A-11B, the track 512 may be moved along a non-linear path relative to the base 502 so that the flap 104 coupled to the fixed end portion 520 of the track 512 also moves along the non-linear path. As shown in the Figures, the track 512 may move between, and inclusive of, a stowed position 900, an intermediate position 1000, and a deployed position 1100 so that the flap 104A-C also moves between a stowed position 900, an intermediate position 1000, and a deployed position 1100 relative to the aircraft wing 102. In some embodiments, the track 512 includes an S-shaped curve 906 having two inflection points 908A, 908B so that the flap 104A-C follows a drop-down path relative to the aircraft wing 102. In other embodiments, the track 512 includes another path shape such as a curve, a spline, or any other suitable shape.

Figure 9A:
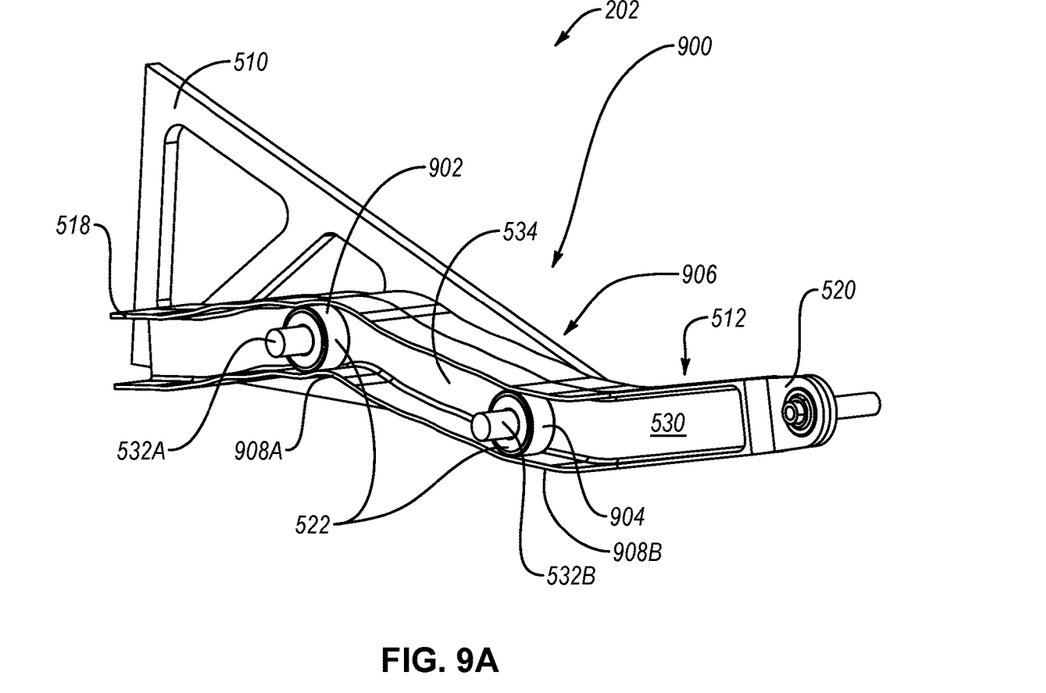
FIG. 9A is a cut-away perspective view of an auxiliary flap assembly in a stowed position, according to one or more examples of the present disclosure.
Figure 9B:
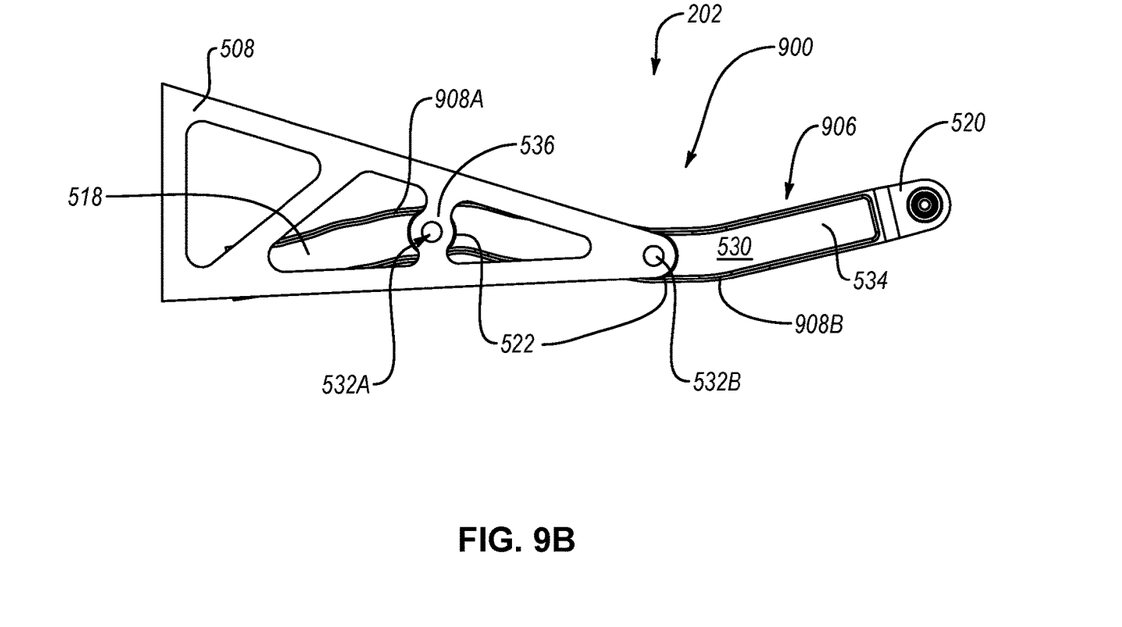
FIG. 9B is a side view of the auxiliary flap assembly of FIG. 9A, according to one or more examples of the present disclosure.
Figure 10A:
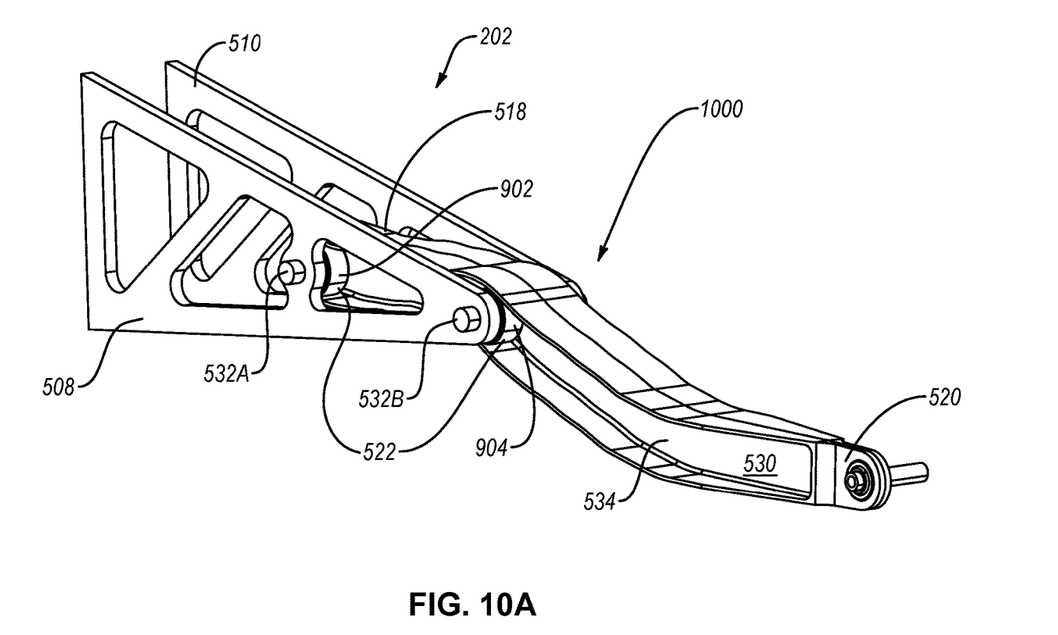
FIG. 10A is a perspective view of an auxiliary flap assembly in an intermediate position, according to one or more examples of the present disclosure.
Figure 10B:
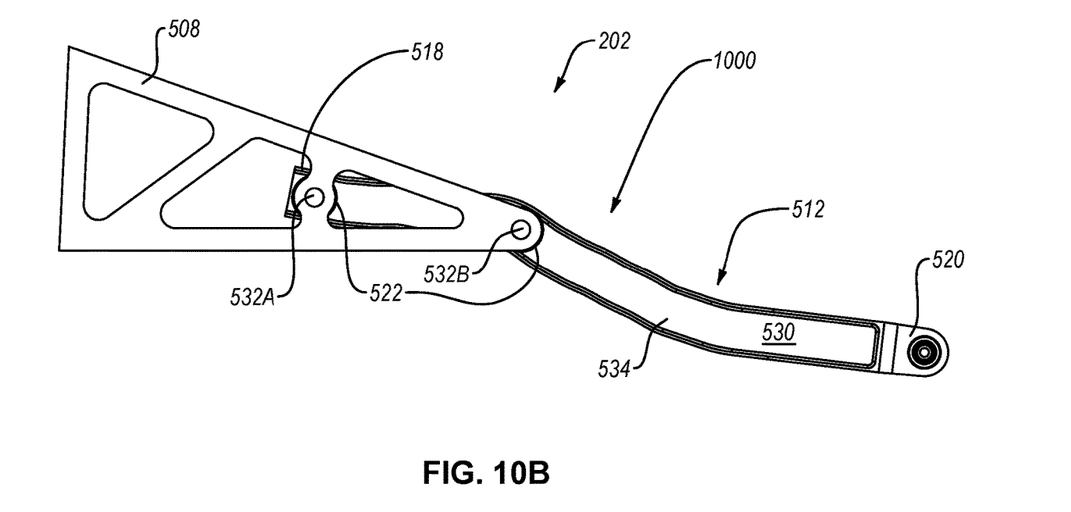
FIG. 10B is a side view of the auxiliary flap assembly of FIG. 10A, according to one or more examples of the present disclosure.
Figure 11A:
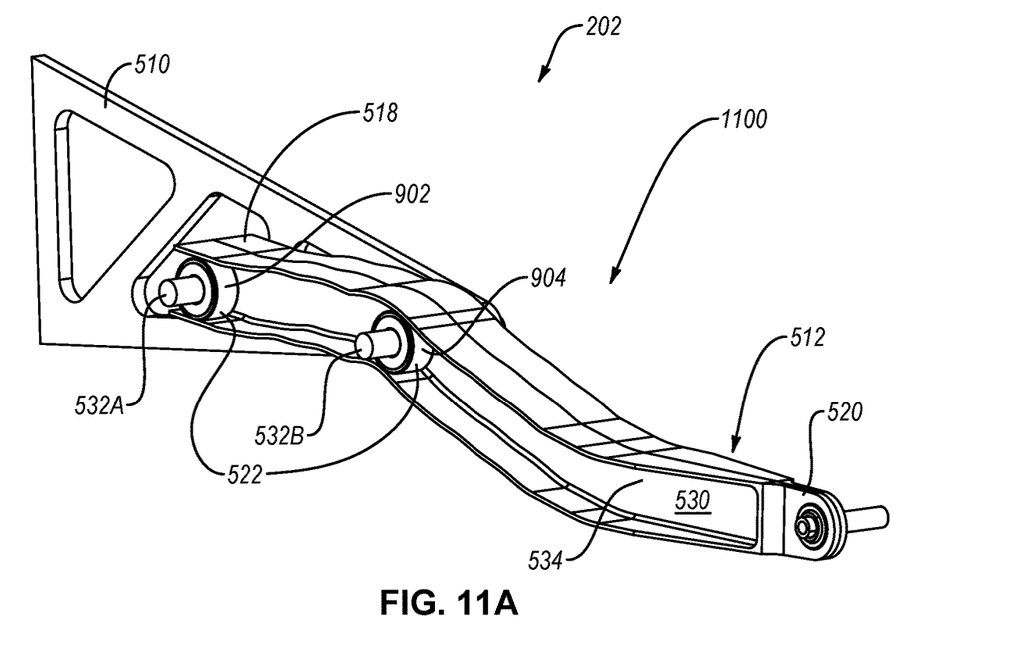
FIG. 11A is a cut-away perspective view of an auxiliary flap assembly in a deployed position, according to one or more examples of the present disclosure.
Figure 11B:
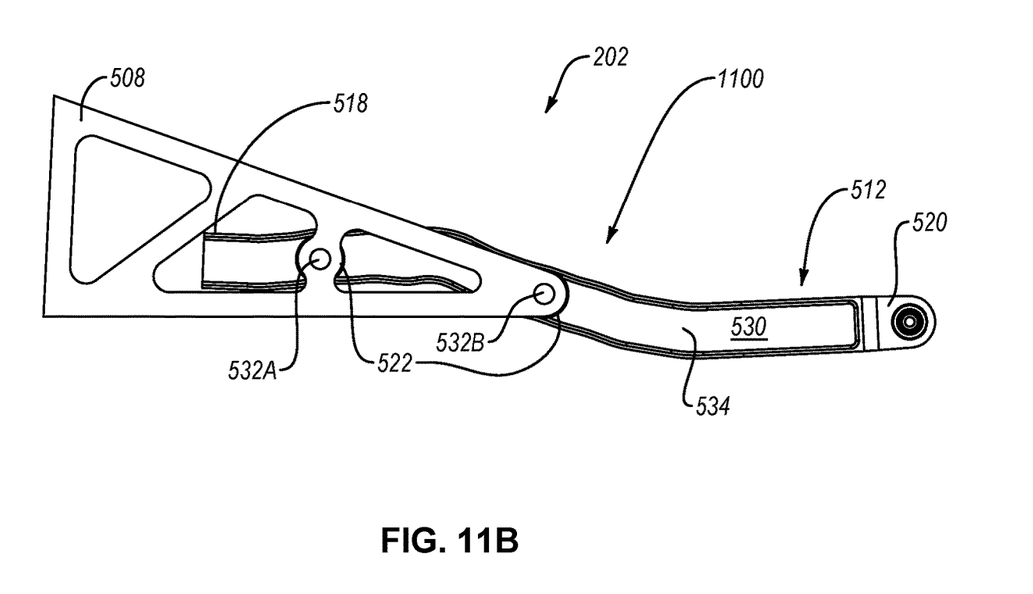
FIG. 11B is a side view of the auxiliary flap assembly of FIG. 11A, according to one or more examples of the present disclosure.

FIGS. 9A and 9B depict one embodiment of the track 512 positioned such that a flap 104 attached to the fixed end portion 520 of the track 512 is in a stowed position 900 relative to the aircraft wing 102. FIGS. 10A and 10B depict the position of the track 512 when that the attached flap 104 is in an intermediate position 1000 relative to the aircraft wing 102. FIGS. 11A and 11B depict the position of the track 512 when the attached flap 104 is in a deployed position 1100 relative to the aircraft wing 102.

To facilitate movement of the track 512 relative to the base 502, one roller of each of the first pair of rollers 522 and the second pair of rollers 524 may be offset relative to the other roller such that each of the rollers of the pair of rollers 522, 524 is aligned with a portion of the track 512. In one embodiment, as shown in FIGS. 9A and 9B, a first roller 902 of the first pair of rollers 522 is attached to a reinforcement rib 536 of the first plate 508 and a second roller 904 of the first pair of rollers 522 is attached to the distal end 506 of the first plate 508. In some embodiments, the first roller 902 is attached to a mid-point of the reinforcement rib 536 such that the first roller 902 is elevated relative to the second roller 904. In this manner, the first roller 902 and the second roller 904 are simultaneously engaged with the track 512, despite the shape of the track 512, such that each one of the first roller 902 and the second roller 904 rolls within and along the first roller path 534. This roller arrangement is duplicated by the second pair of rollers 524 relative to the second roller path, such that each of the first pair of rollers 522 is coaxial with a corresponding one of the second pair of rollers 524. In this manner, the two pairs of rollers 522, 524 may provide redundancy and failsafety, in the event one of the rollers unexpectedly jams, breaks, or otherwise fails, for example.

In some embodiments, the first and the second pair of rollers 522, 524 are configured to distribute, across two load paths, the external load pulling on the flap 104. The two load paths may be provided by the first roller path 534 and the second roller path, where the components of one of the roller paths is duplicated by the other of the roller paths to provide redundancy and failsafety in the event of a jam or component failure. For example, each of the rollers 522, 524 may include one of the breakable pins 532A-D, which are configured to break in response to jamming and/or breaking of a corresponding roller. In some embodiments, each one of the first and the second pair of rollers 522, 524 is configured to tolerate an entirety of the load in the event that a roller jams, breaks, or otherwise fails.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An auxiliary flap assembly for an aircraft wing having a flap, comprising:
   a base fixable to the aircraft wing so that the base does not move relative to the aircraft wing, wherein the base comprises a first plate and a second plate;
   a track coupled to the base and comprising a first half and a second half coupled together in a back-to-back configuration such that a seam extends along an entire length of the track, wherein:
      the first half defines a first roller path;
      the second half defines a second roller path;
      each one of the first roller path and the second roller path extends between a free end portion of the track and a fixed end portion of the track;
      the first roller path and the second roller path are non-linear and include an S-shaped curve;
      at least a portion of each one of the first and the second roller paths is interposed between the first plate and the second plate; and
      the fixed end portion is attachable to the flap;
   a first pair of rollers having a spaced-apart configuration, wherein the rollers of the first pair of rollers are disposed within the first roller path and are rotatable about corresponding first axes defined by corresponding first pins, wherein the first pins are fixed to the first plate such that the first axes do not move relative to the base and the aircraft wing; and
   a second pair of rollers having a spaced-apart configuration, wherein the rollers of the second pair of rollers are disposed within the second roller path and are rotatable about corresponding second axes defined by corresponding second pins, wherein the second pins are fixed to the second plate such that the second axes do not move relative to the base and the aircraft wing, wherein the track is movable along the first pair of rollers and the second pair of rollers to move the flap between, and inclusive of, a stowed position and a deployed position;
   wherein:
      each one of the first half and the second half comprises a channel having an upper surface and a lower surface opposite the upper surface;
      the channel of the first half defines the first roller path;
      the channel of the second half defines the second roller path;
      each roller of the first pair of rollers is contained within the channel of the first half and is capable of rolling along both of the upper surface and the lower surface of the channel of the first half; and
      each roller of the second pair of rollers is contained within the channel of the second half and is capable of configured to alternatingly rolling along both of the upper surface and the lower surface of the channel of the second half.

2. The auxiliary flap assembly of claim 1, wherein the fixed end portion comprises a spherical bearing configured to attach to the flap.

3. The auxiliary flap assembly of claim 2, further comprising a pin extending through the spherical bearing, wherein the pin comprises a pin-in-pin configuration.

4. The auxiliary flap assembly of claim 1, wherein each one of the first roller path and the second roller path has a curved shape.

5. The auxiliary flap assembly of claim 1, wherein each one of the first roller path and the second roller path comprises a plurality of inflection points.

6. The auxiliary flap assembly of claim 1, wherein the channel of each one of the first half and the second half is a C-shaped channel.

7. The auxiliary flap assembly of claim 6, wherein each roller of the first pair of rollers is coaxial with a corresponding one of the rollers of the second pair of rollers.

8. The auxiliary flap assembly of claim 7, wherein one roller of the first pair of rollers is offset from the other roller of the first pair of rollers and one roller of the second pair of rollers is offset from the other roller of the second pair of rollers.

9. The auxiliary flap assembly of claim 1, wherein the first pair of rollers is fixed to the first plate, so that the first pair of rollers does not translationally move relative to the first plate, and the second pair of rollers is fixed to the second plate, so that the second pair of rollers does not translationally move relative to the second plate.

10. The auxiliary flap assembly of claim 1, wherein the flap comprises a load, and wherein the first and the second pair of rollers are configured to distribute the load relative to the auxiliary flap assembly.

11. The auxiliary flap assembly of claim 10, wherein each one of the first pins and the second pins comprises a breakable pin configured to break in response to at least one of jamming or breaking of a corresponding roller of the first and the second pair of rollers.

12. The auxiliary flap assembly of claim 11, wherein each one of the first and the second pair of rollers is configured to tolerate an entirety of the load if the other of the first and the second pair of rollers jams or breaks.

13. An aircraft, comprising:
   an aircraft wing;
   a flap coupled to the aircraft wing and extending in a spanwise direction from an inboard end to an outboard end; and
   an auxiliary flap assembly coupled to the flap and to the aircraft wing, the auxiliary flap assembly comprising:
      a base coupled to the aircraft wing so that the base does not move relative to the aircraft wing, wherein the base comprises a first plate and a second plate;
      a track coupled to the base and comprising a first half and a second half coupled together in a back-to-back configuration such that a seam extends along an entire length of the track, wherein:
         the first half defines a first roller path;
         the second half defines a second roller path;
         each one of the first roller path and the second roller path extends between a free end portion of the track and a fixed end portion of the track;
         the first roller path and the second roller path are non-linear and include an S-shaped curve;
         at least a portion of each one of the first and the second roller paths is interposed between the first plate and the second plate; and
         the fixed end portion is attached to the flap;
      a first pair of rollers having a spaced-apart configuration, wherein the rollers of the first pair of rollers are is disposed within the first roller path and are rotatable about corresponding first axes defined by corresponding first pins, wherein the first pins are fixed to the first plate such that the first axes do not move relative to the base and the aircraft wing; and
      a second pair of rollers having a spaced-apart configuration, wherein the rollers of the second pair of rollers are disposed within the second roller path and are rotatable about corresponding second axes defined by corresponding second pins, wherein the second pins are fixed to the second plate such that the second axes do not move relative to the base and the aircraft wing, wherein the track is movable along the first pair of rollers and the second pair of rollers to move the flap between, and inclusive of, a stowed position and a deployed position relative to the aircraft wing;

wherein:

each one of the first half and the second half comprises a channel having an upper surface and a lower surface opposite the upper surface;

the channel of the first half defines the first roller path;

the channel of the second half defines the second roller path;

each roller of the first pair of rollers is contained within the channel of the first half and is capable of rolling along both of the upper surface and the lower surface of the channel of the first half; and each roller of the second pair of rollers is contained within the channel of the second half and is capable of rolling along both of the upper surface and the lower surface of the channel of the second half.

14. The aircraft of claim 13, wherein the auxiliary flap assembly is coupled to one of the inboard end and the outboard end of the flap.

15. The aircraft of claim 13, wherein the aircraft wing is fairingless at a position of the auxiliary flap assembly.

16. The aircraft of claim 13, further comprising a main flap assembly coupled to the aircraft wing and to the flap, a main fairing coupled to the aircraft wing at a position of the main flap assembly, and an auxiliary fairing coupled to the aircraft wing at the auxiliary flap assembly.

17. The aircraft of claim 16, wherein the auxiliary fairing comprises a depth that is less than two-thirds relative to a depth of the main fairing.

18. The aircraft of claim 16, wherein the auxiliary fairing comprises a depth that is less than one-half relative to a depth of the main fairing.

19. A method, comprising:

moving a track along a non-linear path having an S-shaped curve relative to a base and a aircraft wing so that a flap coupled to an end of the track also moves along the S-shaped curve of the non-linear path between, and inclusive of, a stowed position and a deployed position relative to the aircraft wing, wherein:

the track comprises a first channel and a second channel, opposite the first channel; and the first channel and second channel are separated from each other by a web; and while moving the track, rolling only a first set of rollers within and along the first channel so that each roller of the first set of rollers is capable of rolling along both an upper surface and a lower surface of the first channel and rotates about a corresponding one of two first axes that are fixed and do not move relative to the base and the aircraft wing, and rolling only a second set of rollers within and along the second channel so that each roller of the second set of rollers is capable of rolling along both an upper surface and a lower surface of the second channel and rotates about a corresponding one of two second axes that are fixed and do not move relative to the base and the aircraft wing.

20. The method of claim 19, wherein moving the track comprises moving the track along a curved shape so that the flap follows a drop-down path relative to the aircraft wing.

\* \* \* \* \*